(12) United States Patent
Nagai et al.

(10) Patent No.: US 7,207,847 B2
(45) Date of Patent: Apr. 24, 2007

(54) VEHICLE INTERIOR ILLUMINATION LAMP

(75) Inventors: Kentaro Nagai, Haibara-gun (JP);
Yoshinori Hirayama, Yokohama (JP)

(73) Assignee: Yazaki Corporation, Tokyo (JP)

( * ) Notice: Subject to any disclaimer, the term of this patent is extended or adjusted under 35 U.S.C. 154(b) by 75 days.

(21) Appl. No.: 11/111,793

(22) Filed: Apr. 22, 2005

(65) Prior Publication Data
US 2005/0258764 A1 Nov. 24, 2005

(30) Foreign Application Priority Data
May 21, 2004 (JP) .......................... P2004-151825

(51) Int. Cl.
*H01R 24/00* (2006.01)
*H01R 33/00* (2006.01)

(52) U.S. Cl. .................... 439/699.2; 439/419

(58) Field of Classification Search .............. 439/76.2, 439/419, 699.2
See application file for complete search history.

(56) References Cited

U.S. PATENT DOCUMENTS

| | | | | |
|---|---|---|---|---|
| 5,585,665 A | * | 12/1996 | Anjoh et al. ................. | 257/666 |
| 5,695,367 A | * | 12/1997 | Takano et al. ............ | 439/699.2 |
| 5,729,436 A | * | 3/1998 | Yoshigi et al. .............. | 361/752 |
| 5,759,053 A | * | 6/1998 | Sugiyama .................... | 439/212 |
| 6,619,963 B2 | * | 9/2003 | Nagai ........................... | 439/34 |
| 2002/0031924 A1 | * | 3/2002 | Davis et al. ............... | 439/76.2 |
| 2005/0258764 A1 | * | 11/2005 | Nagai et al. .................. | 315/77 |

FOREIGN PATENT DOCUMENTS

| | | |
|---|---|---|
| DE | 195 19 752 A1 | 12/1995 |
| DE | 100 65 542 C2 | 7/2003 |
| DE | 103 21 708 A1 | 12/2003 |
| JP | 2001-180372 A | 7/2001 |

* cited by examiner

*Primary Examiner*—James R. Harvey
(74) *Attorney, Agent, or Firm*—Sughrue Mion, PLLC

(57) ABSTRACT

An integral bus bar 81, having a plurality of wiring bus bars 50 formed integrally therewith, is mounted in a housing 81, and bridge portions 82, interconnecting the wiring bus bars 50, are cut, thereby separating the wiring bus bars. The integral bus bar 81 includes bulb holding portions 52 for respectively holding opposite end portions of a bulb, and each of the bulb holding portions includes a pair of holding piece portions 61 for holding the corresponding end portion of the bulb therebetween. The wiring bus bars 50 are arranged to extend in a direction of arrangement of the bulb which is to be held in the bulb holding portions 52. The holding piece portions 61 of each bulb holding portion 52 are bent respectively at opposite side edges of a support wall portion 83, extending upwardly from the corresponding wiring bus bar 50, in the direction of arrangement of the bulb, and are disposed in opposed relation to each other.

4 Claims, 9 Drawing Sheets

VEHICLE INTERIOR ILLUMINATION LAMP

BACKGROUND OF THE INVENTION

1. Field of the Invention

This invention relates to a vehicle interior illumination lamp for mounting on a ceiling of a vehicle.

2. Related Art

There is known the type of vehicle interior illumination lamp for mounting on a vehicle ceiling, in which an integral bus bar, formed by blanking and bending an electrically-conductive metal sheet, is incorporated in a resin-molded housing (see, for example, Unexamined Japanese Patent Publication 2001-180372).

As shown in FIG. 8, this integral bus bar 1 includes contacts 2 forming a switch, an electrical connection portion 3 forming connecting portions for connection to a wire harness, and bulb holding portions 5 for respectively holding terminal portions (opposite end portions) of an incandescent bulb (hereinafter referred to merely as "bulb") in electrically-connected relation thereto. The contacts 2, the electrical connection portions 4 and the bulb holding portions 5 are wired by wiring bus bars 6.

After the integral bus bar 1 is mounted in the housing, the wiring bus bars 6 are separated from one another at bridge portions 7 interconnecting the wiring bus bars 6, so that the integral bus bar 1 formed into a predetermined circuit construction.

In the integral bus bar 1, the wiring bus bars 6, extending to the contacts 2 and the electrical connection portion 3, are arranged to extend in a longitudinal direction of the integral bus bar 1, that is, in a direction of arrangement of the bulb 4 (which is to be held in the bulb holding portions 5), and are disposed respectively at opposite sides of the bulb holding portions 5, and each pair of holding piece portions 5a, forming the bulb holding portion 5, are disposed between the wiring bus bars 6, and are bent in a direction perpendicular to the longitudinal direction (that is, the direction of arrangement of the bulb 4).

Therefore, in order to provide the holding piece portions 5a, the integral bus bar 1 must be formed in the blanking operation in such a manner that those portions thereof to be formed into the holding piece portions 5a extend in the direction of the width of the integral bus bar 1 as shown in FIG. 9, and therefore the integral bus bar 1 inevitably had an increased size.

Therefore, because of the increased size of the integral bus bar 1, the efficiency of the operation for mounting the interior illumination lamp (employing the integral bus bar 1) in the housing was low, and besides it was difficult to achieve a compact size of the interior illumination lamp

SUMMARY OF THE INVENTION

This invention has been made in view of the above circumstances, and an object of the invention is to provide a vehicle interior illumination lamp in which the efficiency of an assembling operation is enhanced, and a compact design can be achieved.

The above object has been achieved by a vehicle interior illumination lamp of the present invention having features recited in the following Paragraphs.

A vehicle interior illumination lamp wherein an integral bus bar, having a plurality of wiring bus bars formed integrally therewith, is mounted in a housing provided with a bulb, and interconnecting portions of the integral bus bar, interconnecting the wiring bus bars, are removed so as to separate the wiring bus bars, so that wiring of the bulb is formed by the wiring bus bars; provided in that:

the integral bus bar includes bulb holding portions for respectively holding opposite end portions of the bulb, and each of the bulb holding portions includes a pair of holding piece portions for holding the corresponding end portion of the bulb therebetween; and the wiring bus bars are arranged to extend in a direction of arrangement of the bulb which is to be held in the bulb holding portions; and the holding piece portions of each of the bulb holding portions are bent respectively at opposite side edges of a support wall portion, extending upwardly from the corresponding wiring bus bar, in the direction of arrangement of the bulb, and are disposed in opposed relation to each other.

The vehicle interior illumination lamp, recited in the above, is further provided in that the integral bus bar includes an electrical connection portion having a plurality of connection terminals for connection to a wire harness, and the connection terminals are formed respectively at extension portions, and the extension portions extend respectively from the corresponding wiring bus bars in the direction of arrangement of the bulb, and are disposed in parallel juxtaposed relation to one another.

The vehicle interior illumination lamp, recited in the above, is further provided in that the integral bus bar includes a switch connection portion having a plurality of contacts forming a switch, and the contacts are formed respectively by plate portions which extend respectively from the corresponding wiring bus bars in the direction of arrangement of the bulb, the plate portions being bent.

In the vehicle interior illumination lamp of the above, each pair of holding piece portions, forming the bulb holding portion, are bent respectively at the opposite side edges of the corresponding support wall portion, extending upwardly from the wiring bus bar, in the direction of arrangement of the bulb. Therefore, in a developed condition of the integral bus bar before the bending operation, the holding piece portions are arranged to extend along the wiring bus bar.

Therefore, the width of the integral bus bar can be reduced as much as possible, and therefore the efficiency of the operation for mounting the integral bus bar in the housing can be greatly enhanced, and also the compact design can be achieved.

In the vehicle interior illumination lamp of the above, the extension portions of the electrical connection portion, having the connection terminals, extend respectively from the corresponding wiring bus bars in the direction of arrangement of the bulb, and are disposed in parallel juxtaposed relation to one another. Therefore, even in the developed condition of the integral bus bar, the extension portions are disposed within the region of a relatively small width. By changing the lengths of the extension portions, the positions of the connection terminals for connection to wires of the wire harness can be easily changed, and therefore the degree of freedom of the circuit design can be enhanced.

In the vehicle interior illumination lamp of the above, the contacts of the switch connection portion are formed respectively by the plate portions which extend respectively from the corresponding wiring bus bars in the direction of arrangement of the bulb 22, and these plate portions are bent. Therefore, even in the developed condition, the contacts are disposed within the region of a relative small width.

In the present invention, the efficiency of the assembling operation is enhanced, and also the compact design can be achieved.

DETAILED DESCRIPTION OF THE PREFERRED EMBODIMENTS

A preferred embodiment of the present invention will now be described in detail with reference to the drawings.

Figure 1:
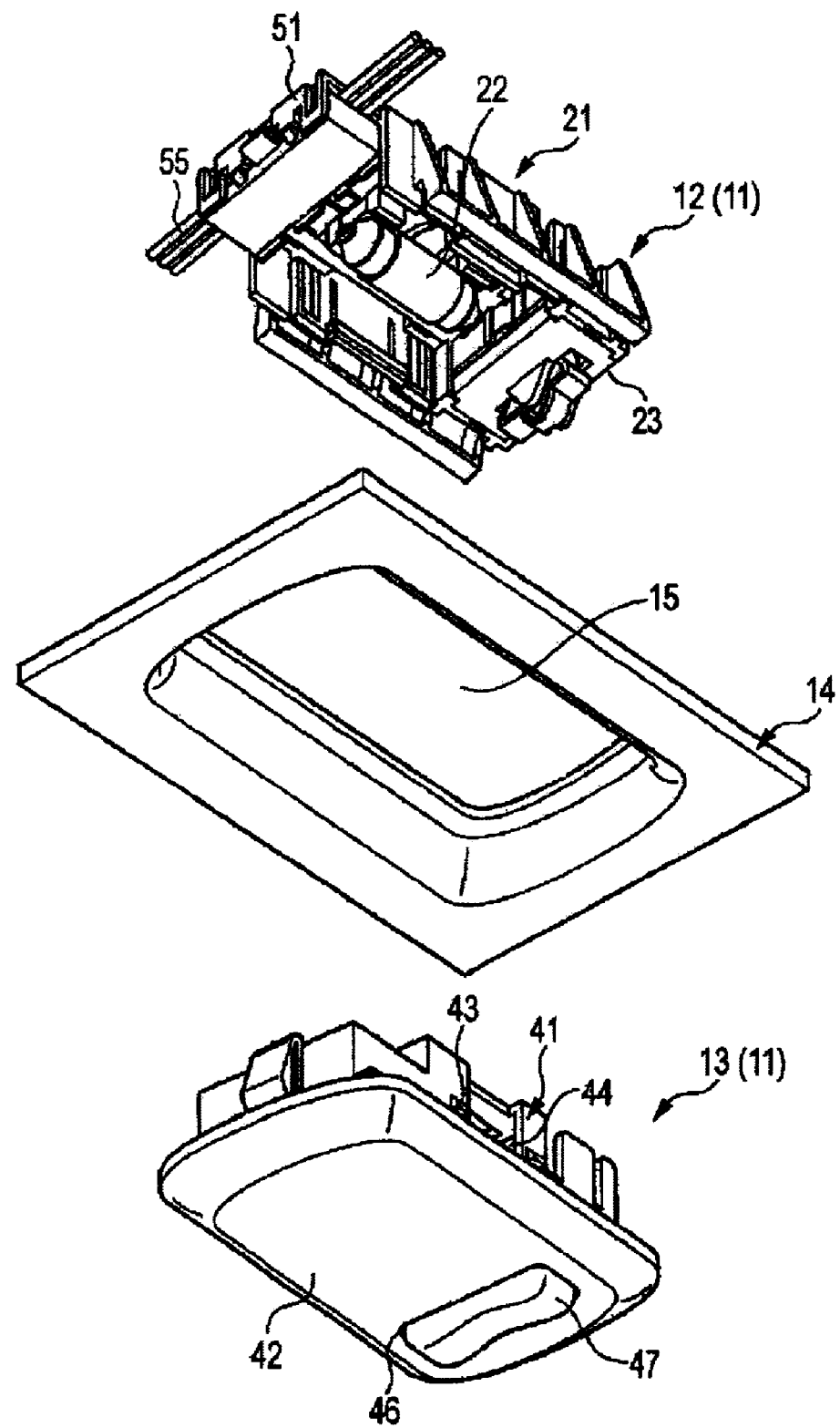
FIG. 1 is an exploded, perspective view of a preferred embodiment of a vehicle interior illumination lamp of the present invention, showing its structure.
Figure 2:
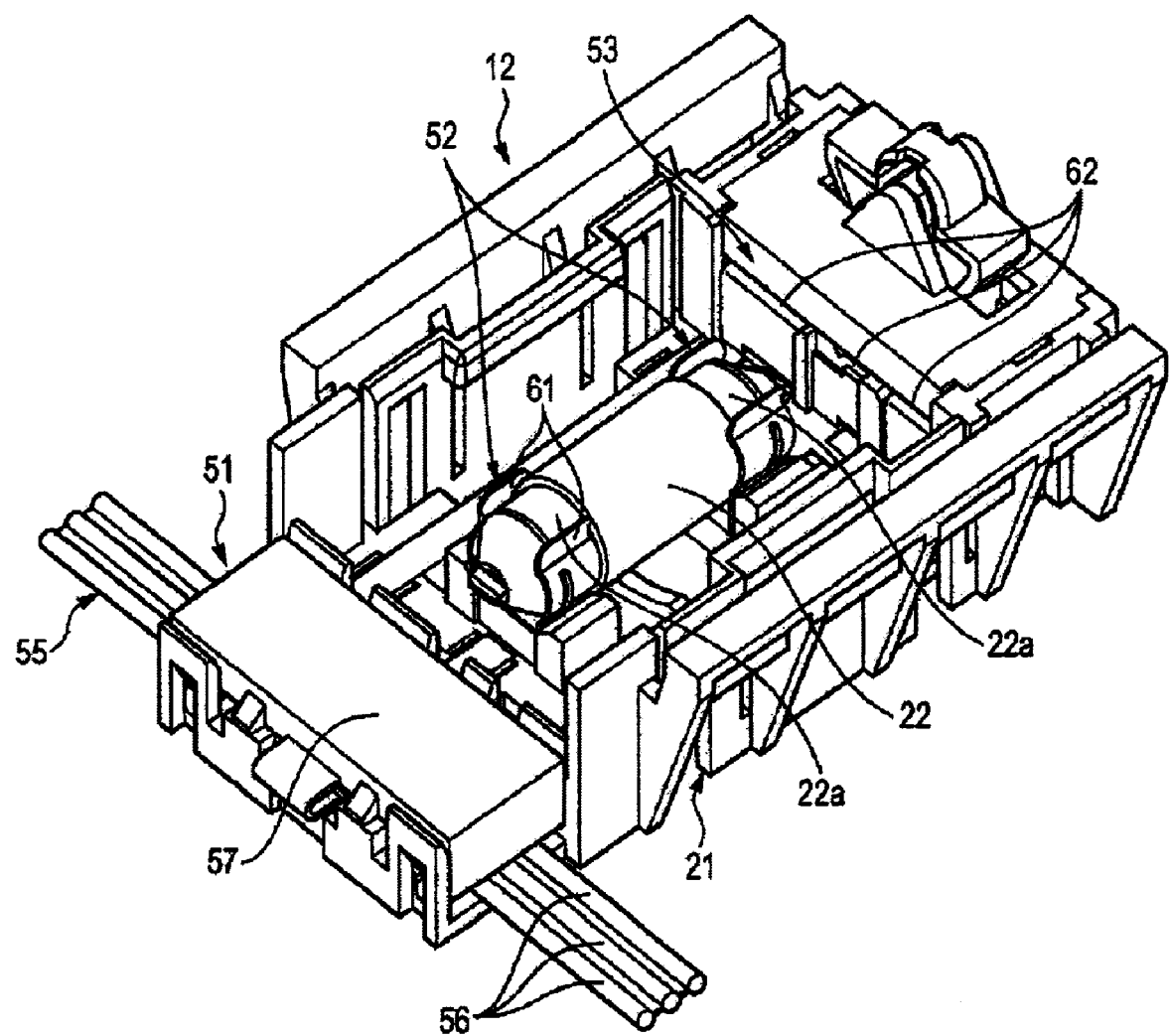
FIG. 2 is a perspective view showing the structure of a function portion of the interior illumination lamp of FIG. 1.
Figure 3:
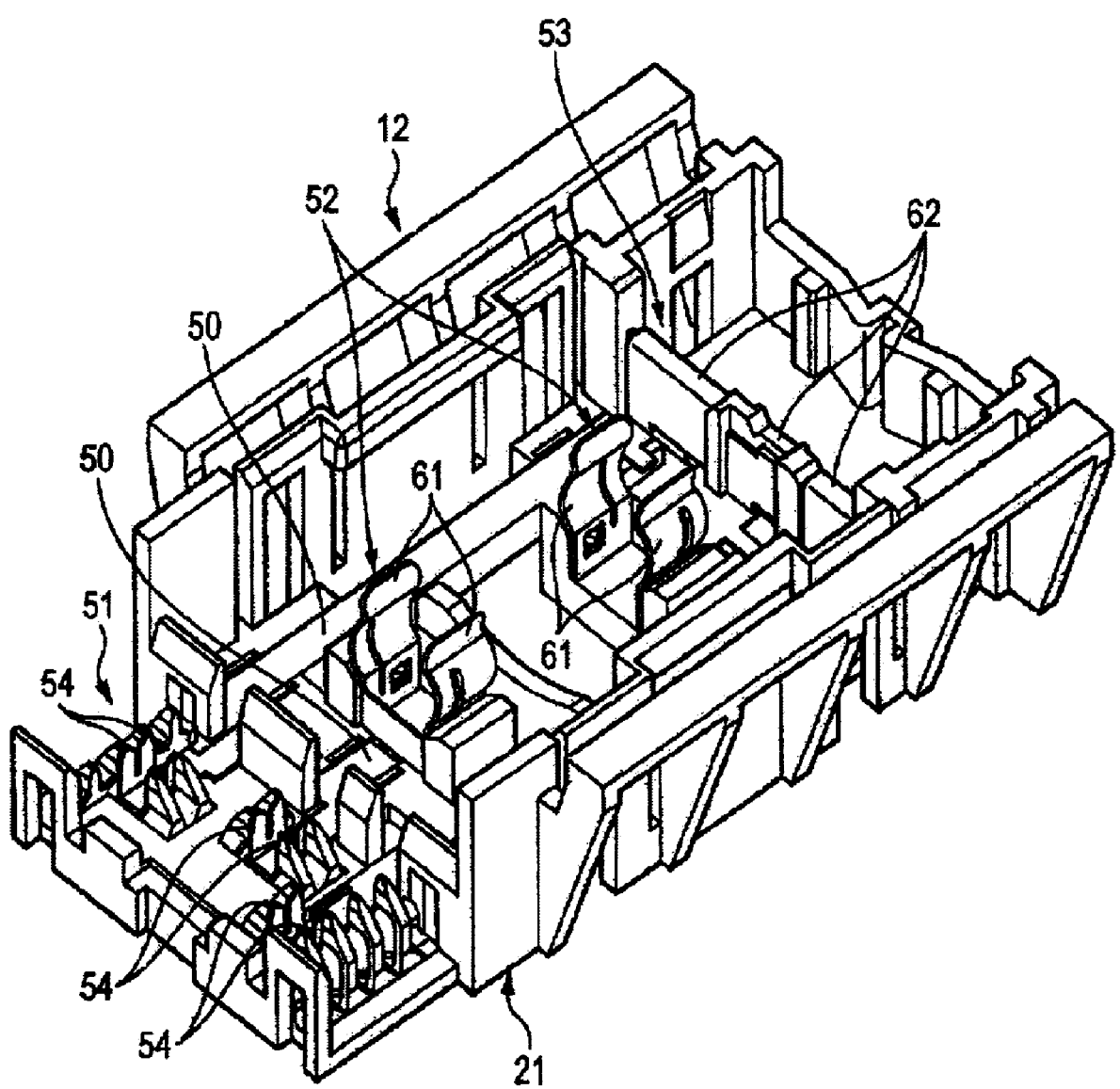
FIG. 3 is a perspective view showing the internal structure of the function portion of the interior illumination lamp of FIG. 1.
Figure 4:
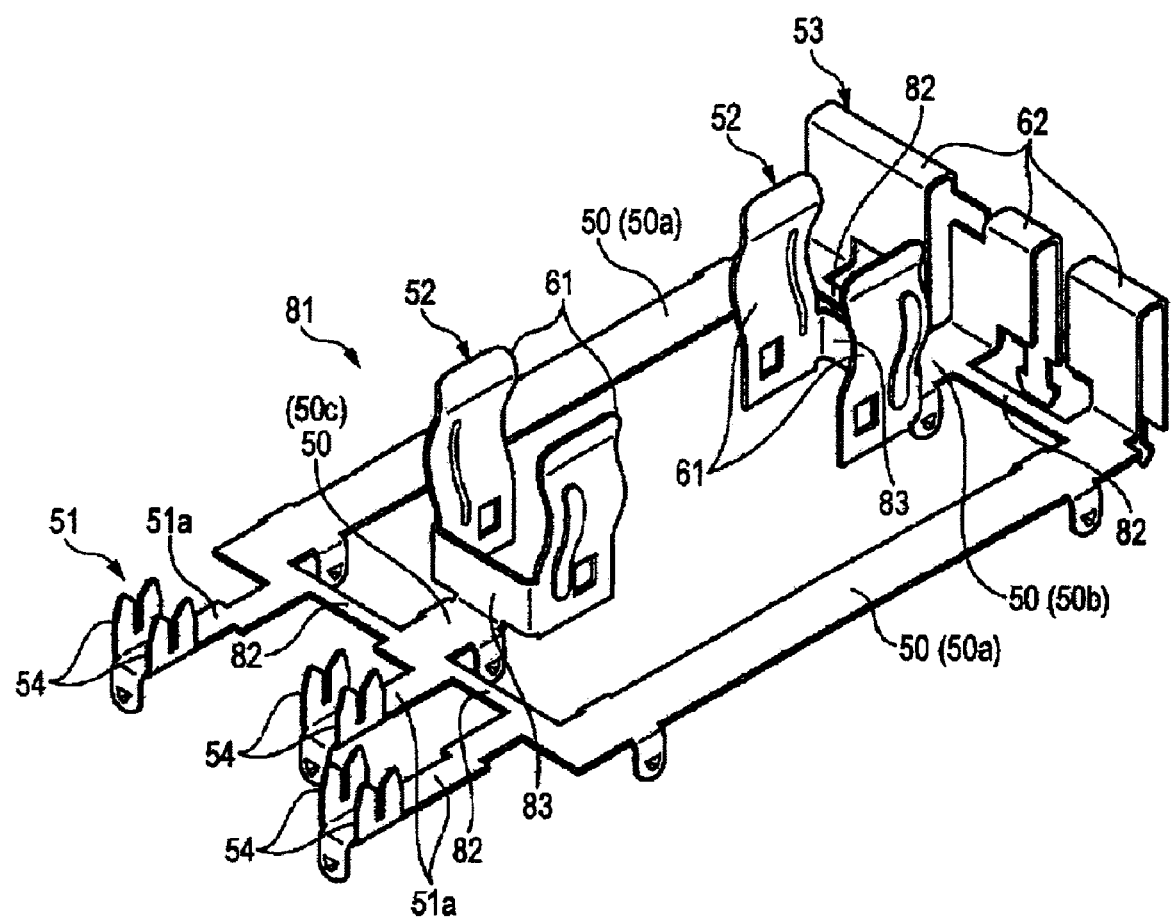
FIG. 4 is a perspective view showing the shape of an integral bus bar to be mounted in the function portion of the interior illumination lamp of FIG. 1.
Figure 5:
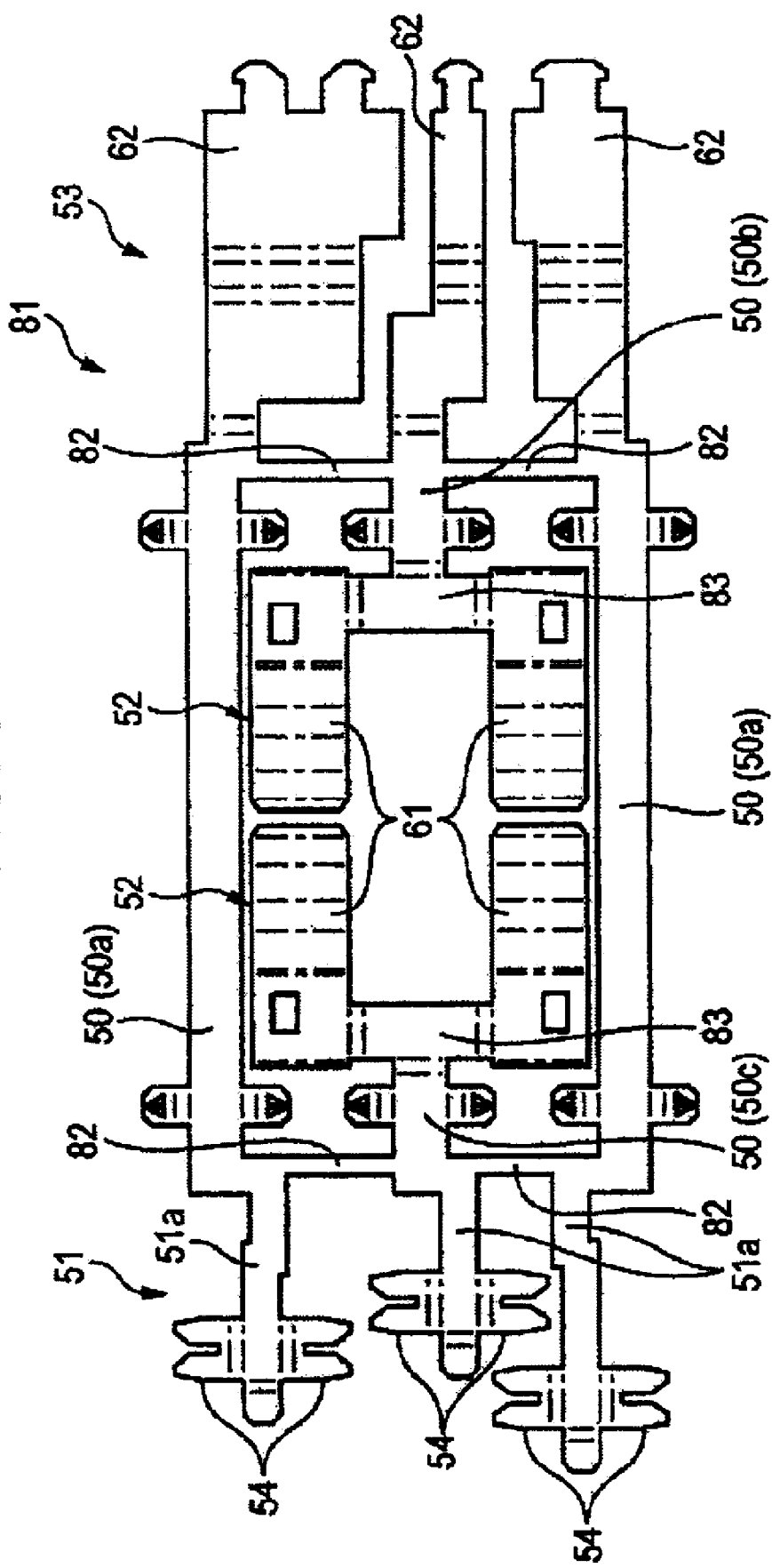
FIG. 5 is a plan view explanatory of a developed shape of the integral bus bar.

FIG. 1 is an exploded, perspective view of the preferred embodiment of a vehicle interior illumination lamp of the invention, showing its structure, FIG. 2 is a perspective view showing the structure of a function portion of the interior illumination lamp of FIG. 1, FIG. 3 is a perspective view showing the internal structure of the function portion of the interior illumination lamp of FIG. 1, FIG. 4 is a perspective view showing the shape of an integral bus bar to be mounted in the function portion of the interior illumination lamp of FIG. 1, and FIG. 5 is a plan view explanatory of a developed shape of the integral bus bar.

As shown in FIG. 1, the vehicle interior illumination lamp 11 comprises the function portion 12, and a design portion 13.

The function portion 12 is disposed at a reverse side of a ceiling plate 14 forming a ceiling of a vehicle, and is mounted thereon to be exposed to an opening 15 of a generally rectangular shape formed through the ceiling plate 14. The design portion 13 is mounted in such a manner that it is fitted in the opening 15 in the ceiling plate 14.

The function portion 12 includes a housing 21 of an integral construction molded of a synthetic resin. A bulb 22 and a switch 23 (which are electrical parts) are provided within the housing 21.

The design portion 13 includes a base housing 41, and a lens cover 42 of a transparent or a translucent nature releasably attached to a lower side of the base housing 41.

A bulb receiving chamber 44, having an insertion port 43, is formed within the base housing 41, and the bulb 22, mounted on the function portion 12, is inserted into the bulb receiving chamber 44 through the insertion port 43, and is received therein. A switch receiving portion (not shown) is formed within the base housing 41, and the switch 23, provided at the function portion 12, is received in the switch receiving portion.

An operating lever 47 is provided in a lower portion of the switch receiving portion, and is exposed through a hole 46 formed through the lens cover 42. The operating lever 47 is connected to the switch 23 received in the switch receiving portion. With this construction, the switch 23 is turned on and off by operating the operating lever 47.

As shown in FIGS. 2 and 3, the function portion 12 includes an electrical connection portion 51, bulb holding portions 52, and a switch connection portion 53, and its wiring is formed by a plurality of wiring bus bars 50, so that the function portion has a predetermined circuit construction.

The electrical connection portion 51 includes connection terminals comprising press-contacting blades 54, and wires 56 of a wire harness 55 are press-fitted into the press-contacting blades 54 to be electrically connected thereto. A strain relief cover 57 is fitted on the electrical connection portion 51 so as to prevent the wires 56 from being disengaged from the press-contacting blades 54 when a pulling force acts on the wire harness 55.

Each of the bulb holding portions 52 includes a pair of holding piece portions 61. Terminals 22a, provided respectively at opposite ends of the bulb 22, are gripped respectively by the two pairs of holding piece portions 61 in electrically-connected relation thereto. The switch connection portion 53 includes a plurality of contacts 62 which can be electrically connected to a moving contact (not shown) of the switch 23.

The electrical connection portion 51, the bulb holding portions 52 and the switch connection portion 53 are formed integrally on the integral bus bar 81 (as shown in FIG. 4), and are wired by the wiring bus bars 50. The integral bus bar 81 is mounted in the housing 21, and thereafter bridge portions 82 (described later) are cut by a pressing machine or the like, thereby separating the wiring bus bars 50, so that the integral bus bar is formed into a predetermined wiring structure.

The integral bus bar 81 has the wiring bus bars 50 interconnected by the bridge portions 82, and this integral bus bar 81 is formed by blanking and bending an electrically-conductive metal sheet.

In the integral bus bar 81, the wiring bus bars 50a, extending to the switch connection portion 53 and the electrical connection portion 51, are arranged to extend in the longitudinal direction of the integral bus bar 1, that is, in a direction of arrangement of the bulb 22 (i.e., in a direction of the axis of the bulb 22 which is to be held in the bulb holding portions 52), and are disposed respectively at opposite sides of the bulb holding portions 52.

Each pair of holding piece portions 61, forming the bulb holding portion 52, are disposed between the wiring bus bars 50a, and extend in a direction perpendicular to the longitudinal direction (that is, the direction of arrangement of the bulb 22).

Each pair of holding piece portions 61 are formed respectively at opposite side edges of a support wall portion 83 which is perpendicularly bent relative to the corresponding wiring bus bar 50b, 50c (extending to the switch connection portion 53 or the electrical connection portion 51) to extend upwardly therefrom, and the pair of holding piece portions 61 are bent relative to the support wall portion 83 in the direction of arrangement of the bulb 22 to be disposed in opposed relation to each other.

The wire connection portion 51 includes extension portions 51a which extend respectively from the corresponding wiring bus bars 50 in the longitudinal direction (that is, in the direction of arrangement of the bulb 22), and are disposed in parallel juxtaposed relation to one another. The pairs of press-contacting blades 54 which are bent in the same direction are formed at distal ends of the extension portions 51*a*.

In the switch connection portion 53, the contacts 62 are formed respectively by plate portions which extend respectively from the corresponding wiring bus bars 50 in the longitudinal direction (that is, in the direction of arrangement of the bulb 22), and these plate portions are first bent to extend upwardly, and then are bent back at their intermediate portions to extend in the opposite direction.

In the integral bus bar 81 of the above configuration, each pair of holding piece portions 61, forming the bulb holding portion 52, are bent respectively at the opposite side edges of the corresponding support wall portion 83, extending upwardly from the wiring bus bar 50*b*, 50*c*, in the direction of arrangement of the bulb 22. Therefore, in a developed condition of the integral bus bar 81 before the bending operation, the holding piece portions 61 are arranged to extend in the longitudinal direction (that is, in the direction of arrangement of the bulb 22) as shown in FIG. 5.

Figure 6:
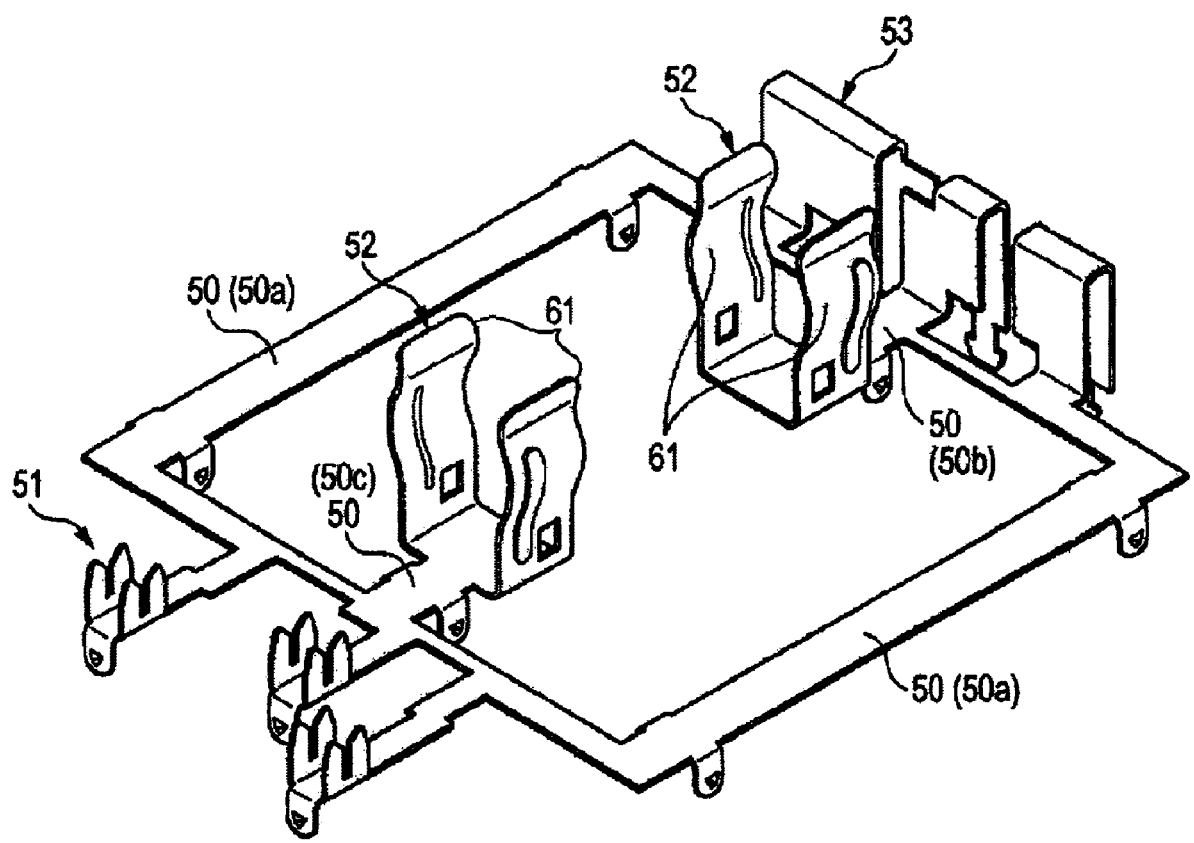
FIG. 6 is a perspective view showing an comparative example of an integral bus bar.
Figure 7:
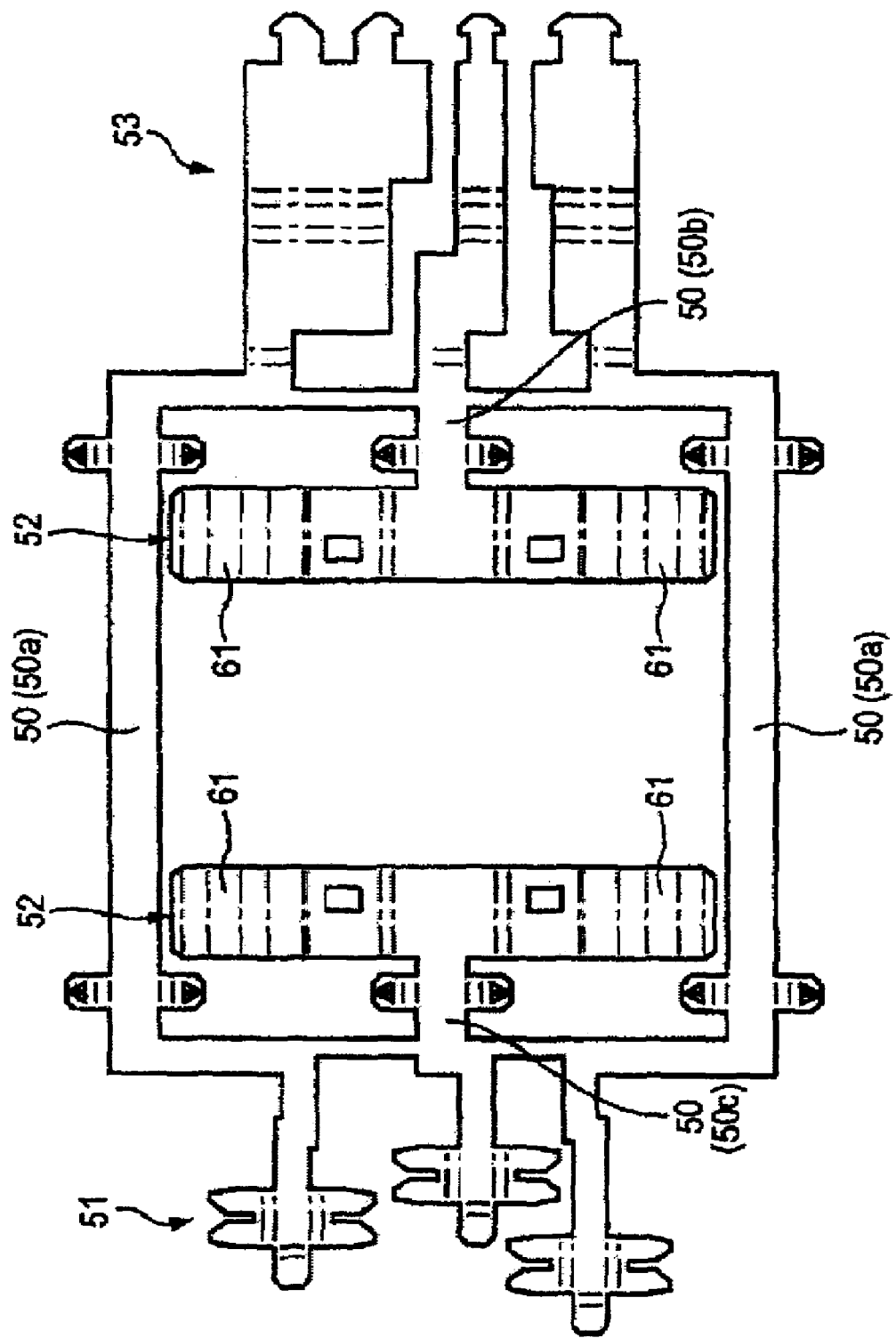
FIG. 7 is a plan view explanatory of a developed condition of the comparative integral bus bar.
Figure 8:
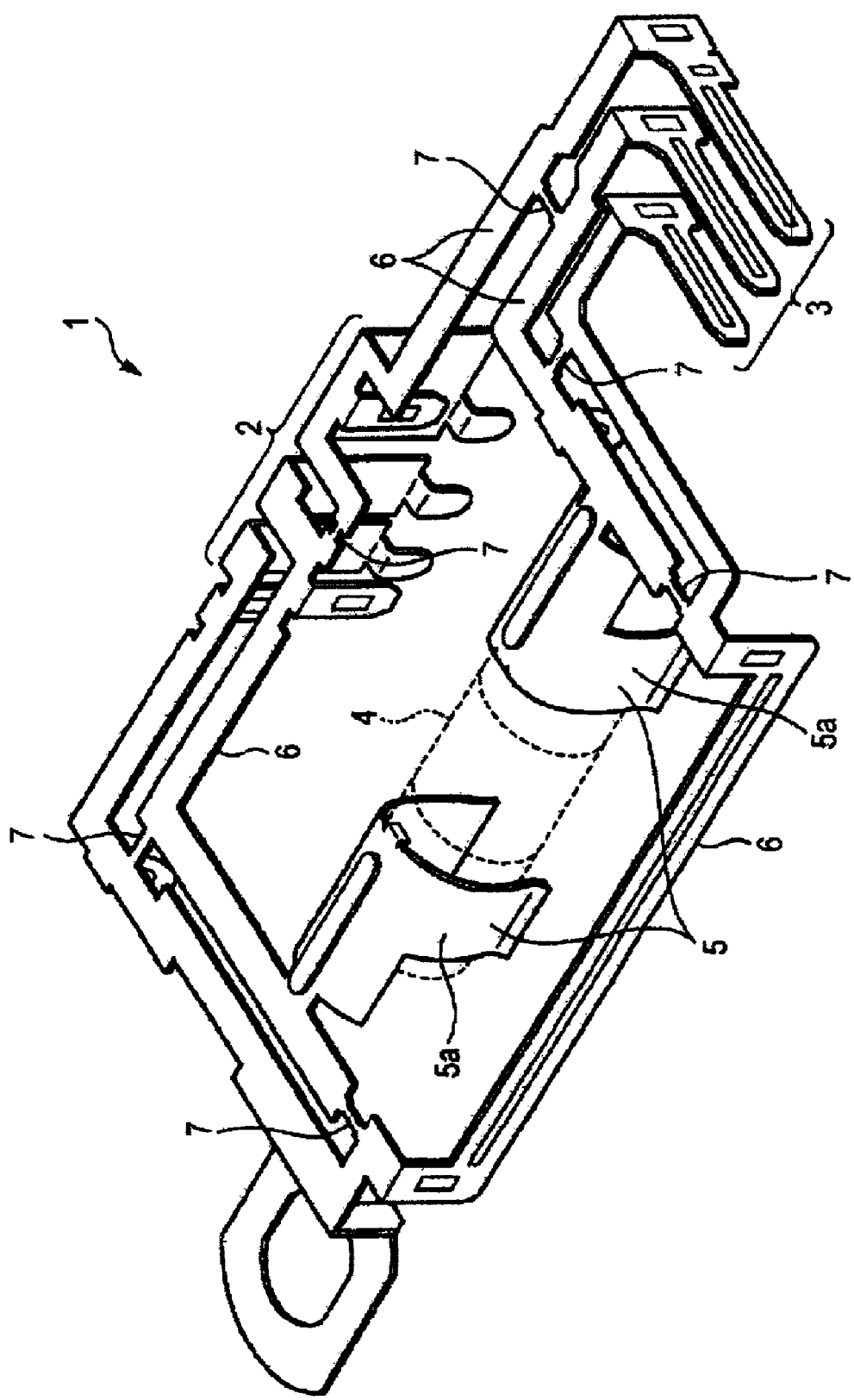
FIG. 8 is a perspective view explanatory of the shape of a conventional integral bus bar used in an interior illumination lamp.
Figure 9:
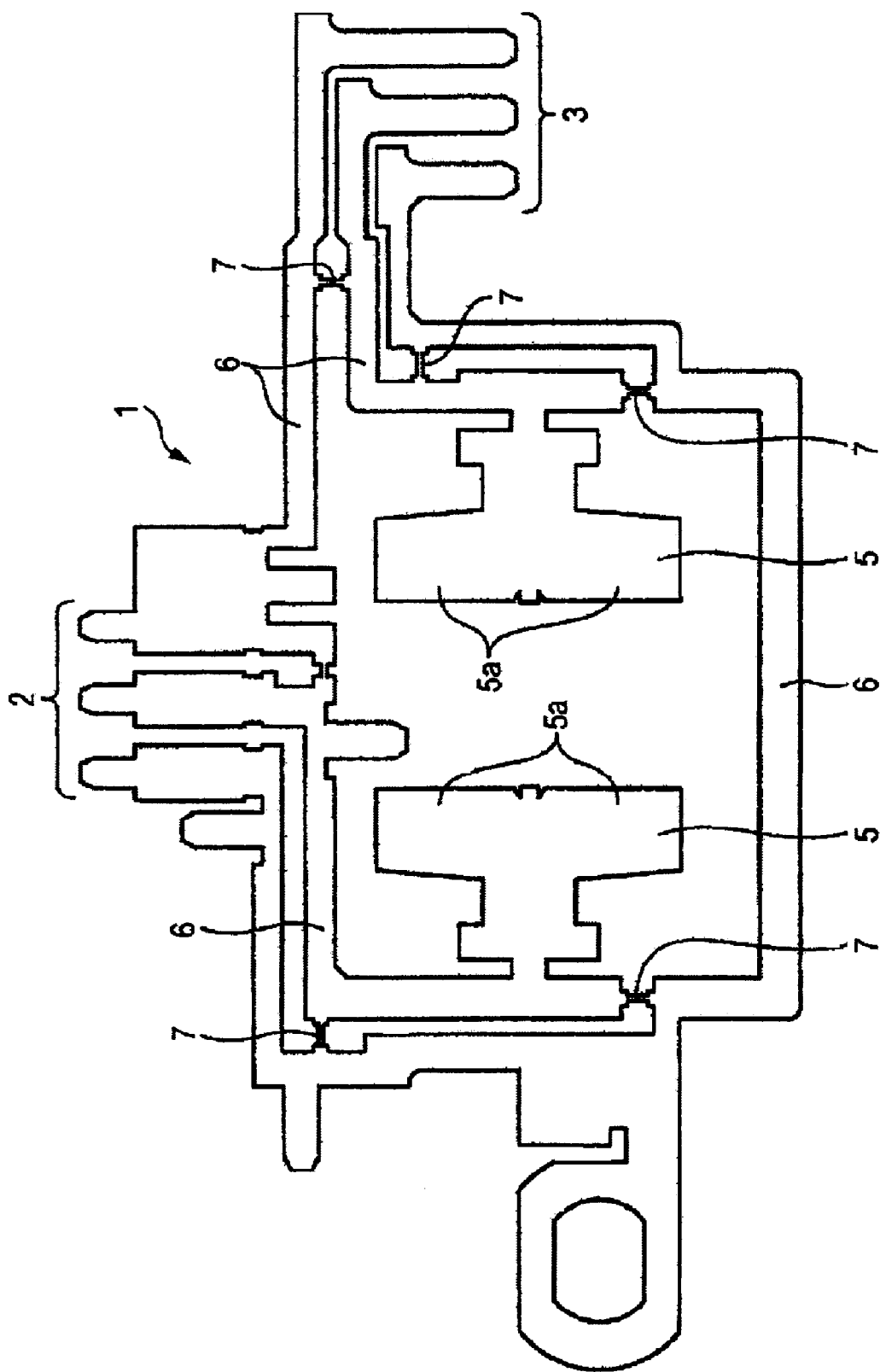
FIG. 9 is a plan view explanatory of a developed condition of the conventional integral bus bar.

In the case where the support wall portions 83 are not provided, and each pair of holding piece portions 61 are bent in a direction perpendicular to the width to be opposed to each other as shown in FIG. 6, the pair of holding piece portions 61 are arranged to extend in the direction of the width in a developed condition of an integral bus bar before a bending operation as shown in FIG. 7.

In this case, the distance between wiring bus bars, provided respectively at opposite side portions of the integral bus bar, increases, thus increasing the width of the integral bus bar, and the efficiency of the operation for mounting the integral bus bar in the housing 21 is lowered, and besides it is difficult to achieve a compact design.

On the other hand, in the vehicle interior illumination lamp 11 of this embodiment, each pair of holding piece portions 61, forming the bulb holding portion 52, are bent respectively at the opposite side edges of the corresponding support wall portion 83, extending upwardly from the wiring bus bar 50*b*, 50*c*, in the direction of arrangement of the bulb 22 as described above. Therefore, in the developed condition of the integral bus bar 81 before the bending operation, the holding piece portions 61 are arranged to extend in the longitudinal direction (that is, in the direction of arrangement of the bulb 22).

Therefore, the distance between the wiring bus bars 50, provided respectively at the opposite side portions of the integral bus bar, can be reduced as much as possible, thus reducing the width of the integral bus bar. Therefore, the efficiency of the operation for mounting the integral bus bar in the housing 21 can be greatly enhanced, and also the compact design can be achieved.

And besides, the extension portions 51*a* of the electrical connection portion 51, having the press-contacting blades 54 formed at their distal ends, extend respectively from the corresponding wiring bus bars 50 in the longitudinal direction (that is, in the direction of arrangement of the bulb 22), and are disposed in parallel juxtaposed relation to one another. Therefore, even in the developed condition of the integral bus bar, the extension portions 51*a* are disposed within the region of a relatively small width. By changing the lengths of the extension portions 51*a*, the positions of the press-contacting blades 54 for connection to the wires 56 of the wire harness 55 can be easily changed, and therefore the degree of freedom of the circuit design can be enhanced.

Furthermore, the contacts 62 of the switch connection portion 53 are formed respectively by the plate portions which extend respectively from the corresponding wiring bus bars 50 in the longitudinal direction (that is, in the direction of arrangement of the bulb 22), and these plate portions are first bent to extend upwardly, and then are bent back at their intermediate portions to extend in the opposite direction. Therefore, in the developed condition, the contacts extend in the longitudinal direction, and are disposed within the region of a relative small width.

The present invention is not limited to the above embodiment, and suitable modifications, improvements and so on can be made. The shape, dimensions, numerical values, form, number, disposition, etc., of each of the constituent elements of the above embodiment are arbitrary, and are not limited in so far as the invention can be achieved.

What is claimed is:

1. An integral bus bar for vehicle interior illumination lamp comprising:
   a plurality of wiring bus bars formed integrally therewith;
   interconnecting portions interconnecting said wiring bus bars, said interconnecting portions removed to separate said wiring bus bars so as to form wiring;
   bulb holding portions for respectively holding opposite end portions of a bulb, and each of said bulb holding portions including a pair of holding piece portions for holding the outer end peripheral portion of said bulb therebetween; and
   a support wall portion extending upwardly from said wiring bus bar, said holding piece portions bent respectively at opposite side edges of said support wall portion in the direction of arrangement of said bulb to face to each other.

2. A vehicle interior illumination lamp according to claim 1, further comprising:
   an electrical connection portion having a plurality of connection terminals, said connection terminals formed respectively at extension portions extending respectively from said wiring bus bars in the direction of arrangement of said bulb.

3. A vehicle interior illumination lamp according to claim 1, further comprising:
   a switch connection portion having a plurality of contacts forming a switch, and said contacts defined by respectively bending plate portions extending respectively from the wiring bus bars in the direction of arrangement of said bulb.

4. A vehicle interior illumination lamp according to claim 2, further comprising:
   a switch connection portion having a plurality of contacts forming a switch, and said contacts defined by respectively bending plate portions extending respectively from the wiring bus bars in the direction of arrangement of said bulb.

* * * * *